United States Patent [19]

Peters

[11] Patent Number: 4,696,995
[45] Date of Patent: Sep. 29, 1987

[54] POLY(ESTER-CARBONATES) AND BLENDS BASED ON 3-METHYL-4-HYDROXY-BENZOIC ACID

[75] Inventor: Edward N. Peters, Lenox, Mass.

[73] Assignee: General Electric Company, Pittsfield, Mass.

[21] Appl. No.: 708,731

[22] Filed: Mar. 6, 1985

[51] Int. Cl.⁴ ............................................. C08G 63/62
[52] U.S. Cl. .................................. 528/206; 528/176; 528/193; 528/196
[58] Field of Search ................ 528/206, 176, 193, 196

[56] References Cited

U.S. PATENT DOCUMENTS

| | | | |
|---|---|---|---|
| 3,169,121 | 2/1965 | Goldberg | 528/173 |
| 3,549,593 | 12/1970 | Takekoshi et al. | 528/206 |
| 3,737,409 | 6/1973 | Fox | 528/174 |
| 4,107,143 | 8/1978 | Inata et al. | 528/206 |
| 4,267,304 | 5/1981 | Feasey et al. | 528/206 |

FOREIGN PATENT DOCUMENTS 9213721  12/1984  Japan .................................. 528/206

Primary Examiner—John Kight
Assistant Examiner—M. L. Moore
Attorney, Agent, or Firm—Hedman, Gibson, Costigan & Hoare

[57] ABSTRACT

New heat resistant, thermoplastic copoly)ester-carbonates) based on 3-methyl-4-hydroxy-benzoic acid are disclosed. The copolymers exhibit higher glass transition temperatures due to the presence of the 3-methyl substituent on the benzoate units of the polymer. They are useful in the preparation of thermoplastic engineering compositions for extrusion or molding into shaped articles.

18 Claims, No Drawings

POLY(ESTER-CARBONATES) AND BLENDS BASED ON 3-METHYL-4-HYDROXY-BENZOIC ACID

The aromatic polycarbonate resins are polyesters of carbonic acid that are produced from dihydric or polyhydric phenols through a condensation reaction with a carbonate precursor. Virtually any of the usual thermoplastic processing methods can be used with polycarbonates, including injection molding, sheet and profile extrusion, structural foam molding, thermoforming and blow molding or blown film extrusion. In general, the resulting polycarbonates exhibit high ductility, high stiffness, good dimensional stability, high creep resistance, good electrical properties, low water absorption and good stain resistance. The material is also noted for its glass-like transparency, which has contributed toward its increasing use in medical applications, including sterile packaging films, intravenous feeding kits, and blood processing equipment, for example, oxygenators.

The polycarbonate resins and methods for their preparation are described in the patent literature, including U.S. Pat. No. 3,153,008 (Fox), U.S. Pat. No. 2,946,766 (Schnell, et al.) and U.S. Pat. No. 3,028,365 (Schnell, et al.), which are incorporated herein by reference.

Typically, general-purpose polycarbonates are based on the monomer bisphenol-A. Other polyhydric phenols are useful to form copolymers for special end uses, however. It is known, for instance, that copolymers comprising carbonate, carboxylate and carbocyclic groups in the linear polymer chain can be produced by reacting a difunctional carboxylic acid with a dihydric phenol and a carbonate precursor, such as described in U.S. Pat. No. 3,169,121.

SUMMARY OF THE INVENTION

Novel, improved copoly(ester-carbonate) resins have now been discovered which are based on 3-methyl-4-hydroxy-benzoic acid as a comonomer. The new copolymers are characterized by higher glass transition temperatures and, concomitantly, greater heat resistance compared with poly(bisphenol-A carbonate) homopolymers and corresponding copoly(ester-carbonates) based on non-methyl substituted 4-hydroxy-benzoic acid. The present copolymers and blends prepared from them are processable at higher temperatures with less risk of thermal damage, and the resulting products are capable of withstanding exposure to higher environmental temperatures without undergoing structural distortion.

In making the copoly(ester-carbonate) of this invention, the 3-methyl-4-hydroxy-benzoic acid can be used in virtually any amount, for example, from about 5 to about 50 mole % or more, but amounts from about 10 to about 40 mole % are preferred for best results. In general, the glass transition temperature will vary according to the amount of 3-methyl-4-hydroxy-benzoate present in the copolymer, with higher temperatures being exhibited as the 3-methyl-4-hydroxy-benzoate content is increased.

DETAILED DESCRIPTION OF THE DRAWING

The copolymers of this invention are comprised, on the one hand, of polymeric units derived from 3-methyl-4-hydroxy-benzoic acid, or more specifically, units of 3-methyl-4-hydroxy-benzoate and, on the other hand, of polymeric units of an aromatic carbonate. Preferred for the polycarbonate portion of the copolymer are units of the formula

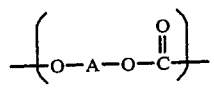

in which A is a divalent aromatic radical of the dihydric phenol employed in the polymer producing reaction. By dihydric phenols is meant mononuclear or polynuclear aromatic compounds containing two hydroxy radicals, each of which is attached to a carbon atom of an aromatic nucleus.

Especially preferred are repeating polycarbonate units of the formula

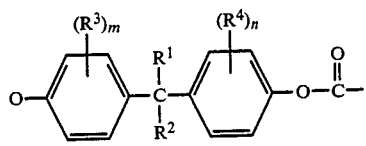

in which $R^1$ and $R^2$ are independently selected from among hydrogen, (lower) alkyl and phenyl; $R^3$ and $R^4$ are independently selected from among (lower) alkyl and (lower) alkenyl; m and n are zero or independently integers from 1 to the maxiumum number of replaceable hydrogen atoms on the ring.

The terms "(lower)alkyl" and "(lower)alkenyl" refer to alkyl and alkenyl groups having from 1 to about 10, more preferably from 1 to about 6 carbon atoms.

The preferred copoly(ester-carbonates) are typically characterized by an average number of repeating units of at least about 30, an average molecular weight (number average) from about 8000 to about 20,000 or greater, and an intrinsic viscosity from about 0.43 to about 1.0 deciliters per gram as measured in solution in chloroform at 25° C.

Typical of the dihydric phenols useful as starting materials in the formation of the above copoly (ester-carbonates) are:

2,2-bis(4-hydroxyphenyl) propane(bisphenol-A); hydroquinone; resorcinol; 2,2-bis(4-hydroxyphenyl) pentane; 2,4'-dihydroxydiphenyl methane; bis(4-hydroxyphenyl) methane; bis(4-hydroxy-5-nitrophenyl)methane; 1,1-bis(4-hydroxyphenyl) ethane; 3,3-bis(4-hydroxyphenyl) pentane; 4,4'-dihydroxydiphenyl; 2,6-dihydroxy naphthalene; bis(4-hydroxyphenyl) sulfone; 2,2'-dihydroxydiphenyl sulfone; 4,4'-dihydroxydiphenyl ether; and 4,4'-dihydroxy-2,5-diethoxydiphenyl ether.

Especially preferred is bisphenol-A.

In the preparation of the copoly(ester-carbonates) of this invention only one dihydric phenol may be used. Alternatively, a mixture of two or more different dihydric phenols may be employed.

Special mention is made of the use of mixtures of two different dihydric phenols, namely bisphenol-A and the bisphenol of acetophenone, to yield a copolymer which, in addition to the benzoate units, comprises units of the formula

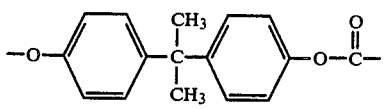

and units of the formula

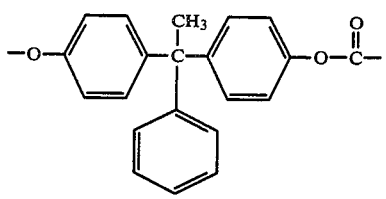

The carbonate precursor which is employed can be a carbonyl halide, a diaryl carbonate, or a haloformate. The carbonyl halides can be carbonyl chloride, carbonyl bromide, and mixtures thereof. The haloformates suitable for use include mono- or bishaloformates of dihydric phenols (bischloroformates of hydroquinone, monochloroformate of bisphenol-A, etc.) or bishaloformates of glycols (bishaloformate of ethylene glycol, neopentyl glycol, polyethylene glycol, etc.). When polymerizing monohaloformates of diphenols no free diphenol is required. The diaryl carbonates include diphenyl carbonate, di(halophenyl) carbonates such as di(chlorophenyl) carbonate, di(bromophenyl) carbonate, di(trichlorophenyl) carbonate, etc., di(alkylphenyl) carbonates such as di(tolyl) carbonate, etc., di(naphthyl) carbonate, di(chloronaphthyl) carbonate, and the like. The preferred carbonate precursor is carbonyl chloride, also known as phosgene.

One method of preparing the copolymers involves the heterogenous interfacial polymerization technique utilizing an aqueous caustic solution, an organic water immiscible solvent such as methylene chloride, 3-methyl-4-hydroxybenzoic acid, at least one dihydric phenol, a carbonate precursor such as phosgene, a catalyst, a molecular weight regulator, and water.

Any water immiscible organic medium in which the reactants and copolymer are soluble may be used as the solvent. Examples of some suitable solvents are chloroform, tetrachloroethane, dichlorobenzene and methylene chloride.

The catalysts which may be employed are any of the suitable catalysts that aid the polymerization reaction of a dihydric phenol with a carbonate precursor to produce a polycarbonate. Thus, suitable polymerization catalysts include, but are not limited to, tertiary amines such as triethylamine, quaternary ammonium compounds, and quaternary phosphonium compounds.

The molecular weight regulators employed may be any of the well known compounds that regulate the molecular weight by a chain terminating mechanism. These compounds include, but are not limited to, phenol, tertiary butyl phenol, Chroman-I, para-cumylphenol, and the like.

The temperature at which the phosgenation reaction proceeds may vary from below 0° C. to above 100° C. The reaction proceeds satisfactorily at temperatures from room temperature (for example, about 25° C.) to about 50° C. Because the reaction is exothermic, the rate of phosgene addition may be used to control the reaction temperature.

The resulting copolymers are commercially useful as such or in the form of admixtures with other thermoplastic polymers and non-polymeric supplementary ingredients. Examples of other thermoplastic polymers that may be employed together with the described copolymers are polyphenylene oxide resins; polyester resins, for example, poly(alkylene terephthalates); poly(vinyl chlorides); polyamides; aromatic polycarbonate resins; polystyrene resins; styrenic copolymers, for example, acrylonitrile-butadiene-styrene (ABS) resins and styrene-butadiene rubbers (SBR); poly(alkyl acrylates); polyurethanes; polyolefins, for example, polyethylene; and so forth. Mixtures of two or more of any of the foregoing may also be used.

Also utilizable in blends with the present copolymers are non-polymeric supplementary ingredients which beneficially affect the chemical, physical or electrical properties. Examples include colorants, for example, dyes or pigments; mineral fillers, for example, clay, talc or mica; reinforcing agents, for example, glass or graphite fibers or titanate whiskers; surfactants; melt flow enhancers; lubricants; mold release agents; stabilizers; antioxidants; impact strength improvers; plasticizers; flame retardants; and so forth. Conventional amounts ranging, for instance, from about 0.5 to about 50% by weight, or more, based on 100 parts of the total composition, are employed.

If desired, the copolymers alone or together with other polymeric and non-polymeric ingredients can be formulated into a foamable composition by the inclusion of an effective amount of a foaming (blowing) agent and, optionally, a nucleating agent.

The compositions of this invention are useful for any of the purposes for which engineering plastics generally and aromatic polycarbonate resins and copoly(ester-carbonate) resins in particular are known. Typically, they can be formed by conventional methods, such as molding, extrusion, and so forth, into articles and component parts of various shapes and sizes, as those skilled in the art will understand. Because of their high heat resistance, the copolymers of this invention are especially useful in the manufacture of molded articles for automobile applications and housewares.

DESCRIPTION OF THE SPECIFIC EMBODIMENTS

The invention is further illustrated in the following examples, which are presented for instructional purposes and are not intended as a limitation on the practice of the invention.

Measurements of the glass transition temperatures (Tg) in the examples are accomplished by differential scanning calorimetry using a Perkin-Elmer DSC-2 (heating rate of 20° C./min.).

EXAMPLE 1

This example illustrates the preparation of a copoly(ester-carbonate) resin in accordance with this invention, containing 10 mole percent of 3-methyl-4-hydroxy-benzoate units in the polymer structure.

The copolymer was obtained using the ingredients and amounts listed below.

| Ingredients | Amount | Number of Moles |
| --- | --- | --- |
| Bisphenol-A | 82.17 g. | 0.360 |
| 3-Methyl-4-hydroxy-benzoic acid | 9.13 g. | 0.060 |
| 4-Tert. butyl phenol | 1.28 g. | 0.0085 (2 mol %) |
| Triethylamine | 1 ml. | |

| Ingredients | Amount | Number of Moles |
|---|---|---|
| Methylene chloride | 600 ml. | |
| Water | 450 ml. | |
| Phosgene (COCl$_2$) | 1.25 g/min. | |

The ingredients were added to a reaction vessel outfitted with a stirrer and gas inlet tube, and the phosgene was bubbled through the mixture at the rate shown (1.25 grams/minute), at room temperature and atmospheric pressure, for a period of 37 minutes. The pH of the reaction mixture was 10.5 to 11.5. The reaction was terminated and the methylene chloride-copolymer solution was washed with water, then with 5% aqueous hydrochloric acid, then agian with water. The copolymer was isolated by flashing off the methylene chloride, which was accomplished by slowly pouring the copolymer solution into vigorously stirred hot water. The white granular powder was collected by filtration and dried. The intrinsic viscosity of the copolymer as measured in solution in chloroform at 25° C. was 0.62 deciliters per gram (dl/g). The glass transition temperature was 155° C. In contrast, the Tg of poly(bisphenol-A carbonate), intrinsic viscosity 0.58 dl/g, CHCl$_3$, 25° C., was 150° C.

EXAMPLE 2

This example illustrates a copolymer according to this invention containing 8 mole percent of 3-methyl-4-hydroxy-benzoate.

The procedure of Example 1 was repeated using the same ingredients, but in the amounts shown below.

| Ingredients | Amount | Number of Moles |
|---|---|---|
| Bisphenol-A | 70.04 g. | 0.306 |
| 3-Methyl-4-hydroxy-benzoic acid | 18.26 g. | 0.120 |
| 4-Tert-butyl phenol | 1.28 g. | 0.0085 (2.0 mol %) |
| Triethylamine | 1 ml. | |
| Methylene chloride | 600 ml. | |
| Water | 450 ml. | |
| Phosgene | 1.25 g/min. (40 minutes) | |

The resulting copolymer had an intrinsic viscosity of 0.55 dl/g (in CHCl$_3$ at 25° C.) and a glass transition temperature (Tg) of 158° C.

EXAMPLE 3 (COMPARISON)

For comparison, a corresponding copolymer was prepared using 28 mole percent of 4-hydroxy-benzoic acid (no methyl substitution) in place of 3-methyl-4-hydroxy-benzoic acid. The specific formulation was as follows:

| Ingredients | Amount | Number of Moles |
|---|---|---|
| Bisphenol-A | 70.04 g. | 0.306 |
| 4-Hydroxy-benzoic acid | 16.57 g. | 0.120 |
| 4-Tert.butyl phenol | 1.28 g. | 0.0085 (2 mol %) |
| Triethylamine | 1 ml. | |
| Methylene chloride | 600 ml. | |
| Water | 450 ml. | |
| Phosgene | 1.25 g/min. (40 minutes) | |

The copolymer in accordance with the invention (Example 2, with 28 mole percent 3-methyl-4-hydroxy-benzoic acid) had an intrinsic viscosity of 0.55 dl/g (CHCl$_3$, 25° C.) and a glass transition temperature of 158° C. The comparison copolymer had an intrinsic viscosity of 0.57 dl/g and a glass transition temperature of only 149° C. The higher glass transition temperature for the copolymer of Example 2 was clearly attributable to the 3-methyl substituent.

EXAMPLE 4

This Example illustrates that the glass transition temperature of a copoly(ester-carbonate) in accordance with the invention can be further elevated by incorporating a second bisphenol into the polymer structure, as shown below. The formulation of the reaction mixture was as follows:

| Ingredients | Amount | Number of Moles |
|---|---|---|
| Bisphenol-A | 49.0 g. | 0.215 |
| Bisphenol of acetophenone | 21.0 g. | 0.072 |
| 3-Methyl-4-hydroxy-benzoic acid | 18.0 g. | 0.118 |
| 4-Tert.butyl phenol | 1.54 g. | 0.0103 (2.5 mol %) |
| Triethylamine | 1 ml. | |
| Methylene chloride | 600 ml. | |
| Water | 450 ml. | |
| Phosgene | 1 g/min. (45 minutes) | |

The intrinsic viscosity of the resulting copoly(ester-carbonate) was 0.52 dl/g (CHCl$_3$, 25° C.). The glass transition temperature was 170° C.

As can be seen from the examples, the inclusion of 3-methyl-4-hydroxy-benzoate units in the copoly(ester-carbonate) resin in amounts of 10 mole percent and higher results in a sharp increase in the glass transition temperature, relative to the comparison homo- and copolymers. This is accomplished, moreover, without affecting the melt viscosity of the polymer.

The invention can be modified beyond the particular embodiments shown in the examples. For instance, other amounts of 3-methyl-4-hydroxy-benzoic acid can be used. The copoly(ester-carbonate) can be mixed with other ingredients to form moldable blend compositions, as previously described. Thus, additional variations may be made without departing from the scope of the invention as defined in the appended claims, and without sacrificing the chief benefits disclosed.

I claim:

1. A linear, high molecular weight, heat resistant thermoplastic copoly(ester-carbonate) resin comprising recurring carbonate units of the formula

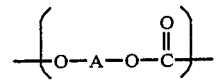

in which A is a divalent aromatic radical of a dihydric phenol, and recurring ester units of the formula

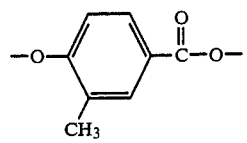

the average number of repeating units being at least about 30.

2. A copolymer according to claim 1, in which the carbonate units are of the formula

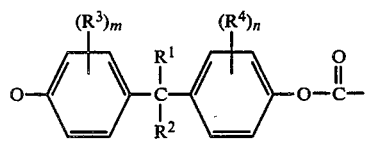

in which $R^1$ and $R^2$ are independently selected from the group consisting of hydrogen, alkyl having from 1 to about 10 carbon atoms, and phenyl; $R^3$ and $R^4$ are independently selected from the group consisting of alkyl having from 1 to about 10 carbon atoms and alkenyl having from 1 to about 10 carbon atoms; m and n are zero or integers from 1 to 4.

3. A copolymer according to claim 2, in which the carbonate is bisphenol-A carbonate.

4. A copolymer according to claim 2, in which the carbonate units include both:

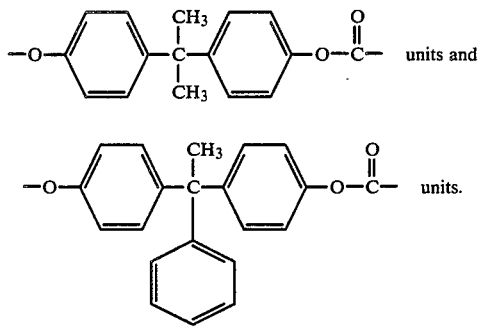

5. A copolymer according to claim 1, which is characterized by a number average molecular weight from about 8,000 to about 20,000.

6. A copolymer according to claim 1, which is characterized by an intrinsic viscosity from about 0.43 to about 1.0 in solution in chloroform at 25° C.

7. A linear, high molecular weight, heat resistant thermoplastic copoly(ester-carbonate) resin which is the reaction product of (1) 3-methyl-4-hydroxy-benzoic acid, (2) one or more dihydric phenols, and (3) a carbonate precursor.

8. A copolymer according to claim 7, in which the dihydric phenol is of the formula

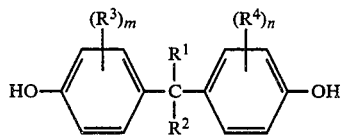

in which $R^1$ and $R^2$ are independently selected from the group consisting of hydrogen, alkyl having from 1 to about 10 carbon atoms, and phenyl; $R^3$ and $R^4$ are independently selected from the group consisting of alkyl having from 1 to about 10 carbon atoms and alkenyl having from 1 to about 10 carbon atoms; and m and n are zero or integers from 1 to 4.

9. A copolymer according to claim 8, which is the reaction product of two dihydric phenols of the formulae

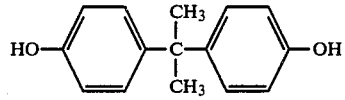

and

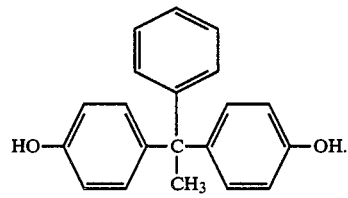

10. A copolymer according to claim 7, in which the carbonate precursor is selected from the group consisting of carbonyl halides, diaryl carbonates and haloformates.

11. A copolymer according to claim 10, in which the carbonate precursor is a carbonyl halide.

12. A copolymer according to claim 11, in which the carbonyl halide is carbonyl chloride.

13. A copolymer according to claim 7, which further includes (4) a molecular weight regulator.

14. A copolymer according to claim 13, in which the molecular weight regulator is tertiary butyl phenol.

15. A thermoplastic composition comprising the copolymer of claim 1 and a polymeric supplementary ingredient selected from the group consisting of polyphenylene oxide resins, polyester resins, poly(vinyl chlorides), polyamides, aromatic polycarbonate resins, polystyrene, resins, poly(alkyl acrylates), polyurethanes, polyolefins, and mixtures of two or more of any of the foregoing.

16. A thermoplastic composition comprising the copolymer of claim 1 and a non-polymeric supplementary ingredient selected from the group consisting of colorants, mineral fillers, fibrous reinforcing agents, surfactants, melt flow enhancers, lubricants, mold release agents, stabilizers, antioxidants, impact strength improvers, plasticizers, flame retardants and mixtures of any of the foregoing.

17. A shaped article molded from the composition of claim 15.

18. A shaped article molded from the composition of claim 16.

* * * * *